United States Patent
Hoogland et al.

(10) Patent No.: US 6,175,454 B1
(45) Date of Patent: Jan. 16, 2001

(54) PANORAMIC IMAGING ARRANGEMENT

(75) Inventors: Jan Hoogland, Grants Pass, OR (US); Edward C. Driscoll, Portola Valley; Willard C. Lomax, Sunnyvale, both of CA (US)

(73) Assignee: BeHere Corporation, Cupertino, CA (US)

( * ) Notice: Under 35 U.S.C. 154(b), the term of this patent shall be extended for 0 days.

(21) Appl. No.: 09/229,807

(22) Filed: Jan. 13, 1999

(51) Int. Cl.[7] ............... G02B 13/06; H04N 9/64; G03B 37/00
(52) U.S. Cl. .................. 359/725; 348/36; 352/69
(58) Field of Search ............. 359/725, 726–731; 348/36; 352/69

(56) References Cited

U.S. PATENT DOCUMENTS

| | | | |
|---|---|---|---|
| 2,638,033 | * 6/1953 | Buchele et al. | 350/441 |
| 3,203,328 | * 8/1965 | Brueggemann | 95/15 |
| 3,209,073 | * 9/1965 | Falbel | 178/6.8 |
| 3,229,576 | 1/1966 | Rees | 88/70 |
| 3,998,532 | 12/1976 | Dykes | 352/69 |
| 4,566,763 | * 1/1986 | Greguss | 350/441 |
| 4,662,726 | * 5/1987 | Rines et al. | 350/444 |
| 5,115,266 | * 5/1992 | Troje | 354/95 |
| 5,473,474 | * 12/1995 | Powell | 359/725 |
| 5,502,309 | * 3/1996 | Davis | 250/353 |
| 5,627,675 | * 5/1997 | Davis et al. | 359/366 |
| 5,631,778 | * 5/1997 | Powell | 359/724 |
| 5,710,661 | * 1/1998 | Cook | 359/364 |
| 5,841,589 | * 11/1998 | Davis et al. | 359/726 |
| 5,877,801 | 3/1999 | Martin et al. | 348/36 |
| 5,920,376 | * 7/1999 | Bruckstein et al. | 352/69 |

* cited by examiner

Primary Examiner—Georgia Epps
Assistant Examiner—David N. Spector
(74) Attorney, Agent, or Firm—Blakely, Sokoloff, Taylor & Zafman LLP

(57) ABSTRACT

According to one aspect of the invention there is provided a panoramic imaging arrangement comprising a transparent component and a reflective material. The transparent component has a first surface about a vertical axis of revolution, a second surface about the axis of revolution, and an opening formed therein to define a third, internal surface about the axis of revolution. The third surface has a concave profile in a plane of the axis of revolution. The reflective material is located on the second surface to provide a reflective surface against the second surface. The first surface, the reflective surface and the third surface are positioned relative to one another so that light from a 360° surrounding panoramic scene enters the transparent component through the first surface, whereafter the light is reflected from the reflective surface, whereafter the light exits the transparent component through the third surface.

14 Claims, 1 Drawing Sheet

PANORAMIC IMAGING ARRANGEMENT

BACKGROUND OF THE INVENTION

1). Field of the Invention

This invention relates to a panoramic imaging arrangement of the kind capable of capturing, focusing, correcting aberrations and otherwise manipulating light received from a 360° surrounding panoramic scene.

2). Discussion of Related Art

Panoramic imaging arrangements have become popular in recent years for purposes of viewing 360° surrounding panoramic scenes. Older generations of panoramic imaging arrangements generally consisted of revolving periscope-like constructions having relatively complex mechanisms for revolving them. More recently, stationary panoramic imaging arrangements have been developed. A stationary panoramic imaging arrangement generally has one or more lenses, each having a vertical axis of revolution, which are used to refract or reflect light received from a 360° surrounding panoramic scene. The lenses alter the direction of the light, whereafter the light passes through a series of lenses which are located vertically one above the other and which further manipulate the light by, for example, focusing the light or altering the intensity of the light.

The task of receiving light in a sideways direction and altering the direction of the light so that the light then proceeds in a vertical direction is a difficult one. Altering the direction of light to such a degree, especially when coming from a 360° surrounding scene, oftentimes leads to aberrations in the resulting light. These aberrations may include astigmatism of the light, defects in color of the light, a loss of image plane flatness, and other defects, some of which are discussed in more detail herein below.

Relatively complex lenses and lens arrangements have been developed in order to overcome these aberrations and produce an acceptable image. These lens arrangements usually include a large number of lenses and oftentimes have lenses with surfaces which are aspherical (see for example U.S. Pat. No. 5,473,474 issued to Powell). Aspherical lenses are difficult to manufacture and therefore less practical to manufacture than for example spherical lenses.

SUMMARY OF THE INVENTION

According to one aspect of the invention there is provided a panoramic imaging arrangement comprising a transparent component and a reflective material. The transparent component has a first surface about a vertical axis of revolution, a second, substantially spherical, surface about the axis of revolution, and an opening formed therein to define a third, internal surface about the axis of revolution. The third surface has a concave profile in a plane of the axis of revolution. The reflective material is located on the second surface to provide a reflective surface against the second surface. The first surface, the reflective surface and the third surface are positioned relative to one another so that light from a 360° surrounding panoramic scene enters the transparent component through the first surface, whereafter the light is reflected from the reflective surface, whereafter the light exits the transparent component through the third surface.

The first surface may have a convex profile in a plane of the axis of revolution and is preferably substantially spherical.

The first surface and the reflective surface are preferably located on opposing sides of the transparent component and the reflective surface preferably has a convex profile in plane of the axis of revolution.

Preferably, at least extensions of the first surface and the reflective surface intersect one another.

The third surface is preferably substantially spherical.

In one embodiment the first surface, the reflective surface and the third surface are all substantially spherical and have a radiuses which are in the relationship of about 21 units for the first surface, about 40 units for the reflective surface, and about 7 units for the third surface.

At least extensions of the first surface and the reflective surface may intersect the axis of revolution at respectively first and second locations which may be about 9 units displaced from one another.

At least an extension of the third surface may intersect the axis of revolution at a third location which is about 0.5 units displaced from the second location.

The panoramic imaging arrangement may further comprise a system of lenses positioned to receive the light after exiting the transparent component, the system of lenses at least focusing the light. The light is preferably focused in a plane which is substantially flat.

Preferably, the light passes through a total of less than five lenses from exiting the transparent component until being focused.

The panoramic imaging arrangement may further comprise a mirror which reflects the light after exiting the transparent component. A hole may be formed through the transparent component with the opening forming at least part of the hole. The light may at least partially pass through the hole after being reflected by the mirror and before passing through the system of lenses. The mirror may be curved and preferably has a concave reflective area.

According to a further aspect of the invention a panoramic imaging arrangement is provided comprising a transparent component and a reflective material. The transparent component has first and second surfaces, both about a vertical axis of revolution. The first surface has a convex profile in a plane of the axis of revolution. The second surface has a concave profile in a plane of the axis of revolution. At least extensions of the first and second surfaces intersect one another. The reflective material is located on the second surface to provide a reflective surface against the second surface. The first surface and the reflective surface are positioned relative to one another so that light from a 360° surrounding panoramic scene enters the transparent component through the first surface, whereafter the light is reflected from the reflective surface.

The second surface may be substantially spherical.

BRIEF DESCRIPTION OF THE DRAWING

The invention is further described by way of example with reference to the accompanying drawing which is a sectioned side view of a panoramic imaging arrangement, according to an embodiment of the invention, in a plane of a vertical axis of revolution thereof.

DETAILED DESCRIPTION OF THE INVENTION

Figure 1:
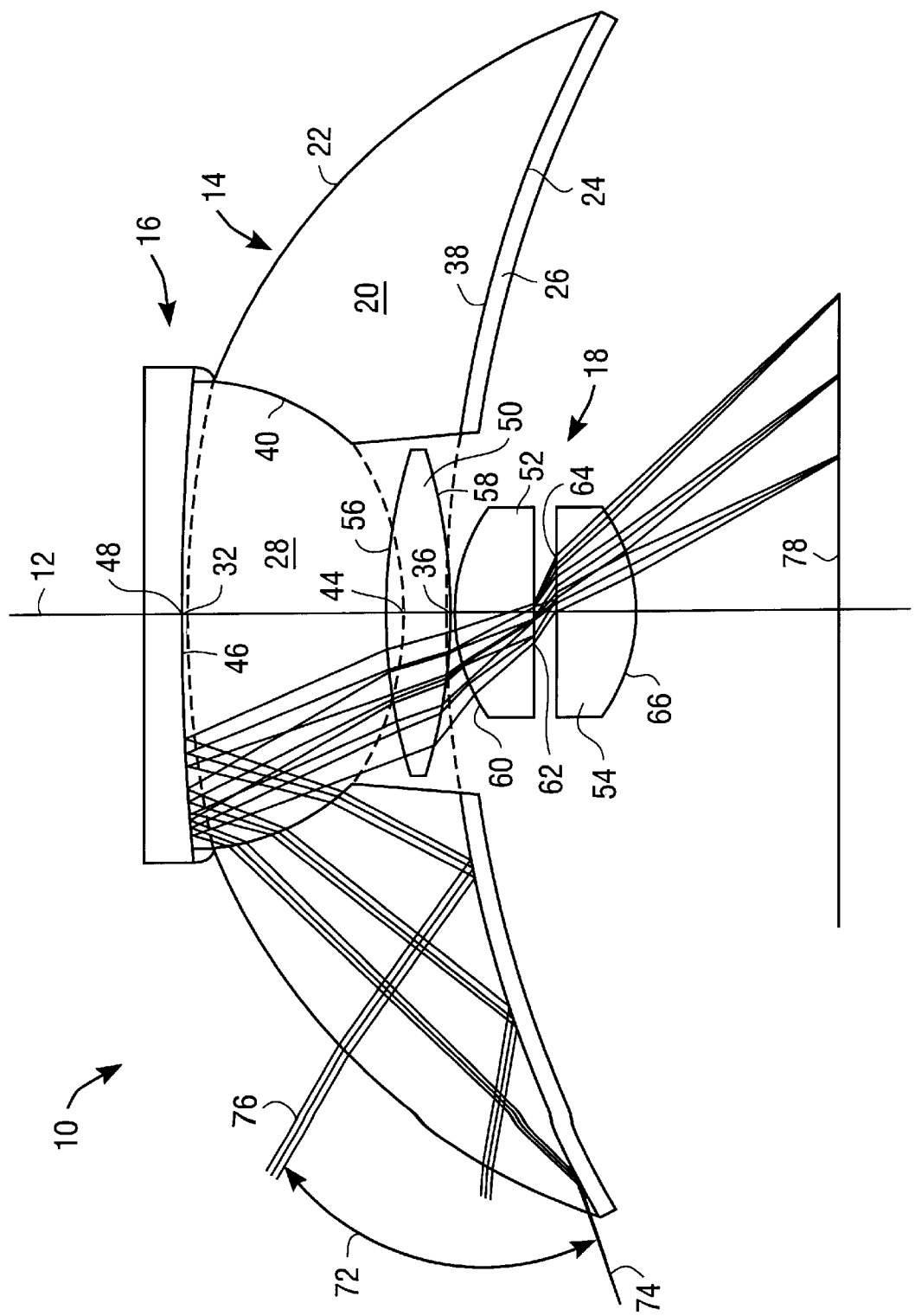

FIG. 1 of the accompanying drawings illustrates a panoramic imaging arrangement 10, according to an embodiment of the invention, in a plane of a vertical axis of revolution 12 thereof. The panoramic imaging arrangement 10 includes a lens block 14, a mirror 16, and a system of lenses 18.

The lens block 14 includes a transparent component 20 having a first, upper, convex surface 22 symmetrically about the axis of revolution 12 and a second, lower, concave surface 24 also symmetrically about the axis of revolution 12. A reflective material 26 is formed on the lower, concave surface 24. A hole 28 is formed vertically through the transparent component 20.

The upper, convex surface 22 of the transparent component 20 is spherical and has a radius of about 21.310 mm. An extension of the upper, convex surface 22 intersects the axis of revolution 12 and a first location 32.

The lower, concave surface 24 of the transparent component 20 is spherical and has a radius of about 40.200 mm. Extensions of the upper, convex surface 22 and of the lower, concave surface 24 intersect one another due to the larger radius of the lower, convex surface 24 with respect to the radius of the upper, convex surface 22. An extension of the lower, concave surface 24 intersects the axis of revolution 12 and a second location 36 which is located about 9 mm below the first location 32 where the extension of the upper, convex surface 22 intersects the axis of revolution 12.

By forming the reflective material 26 on the lower, concave surface 24, the reflective material 26 provides a convex reflective surface 38 against the lower, concave surface 24 and conforming in shape thereto.

An upper portion of the hole 28 is formed by an opening defining a third, internal surface 40 of the transparent component 20. The internal surface 40 is located symmetrically about the axis of revolution 12. The internal surface 40 is spherical and has a concave profile with a radius of about 7.650 mm. An extension of the internal surface 40 intersects the axis of revolution 12 at a third location 44 which is located about 0.5 mm above the second location 36 where the extension of the lower, concave surface 24 (and therefore also of the reflective surface 38) intersects the axis of revolution 12.

The mirror 16 is secured to the transparent component 20 at a location over the hole 28. The mirror 16 has a concave reflective area 46 which is spherical and is located symmetrically about the axis of revolution 12. The reflective area 46 has a radius of about 87.750 mm and intersects to the axis of revolution 12 at a fourth location 48 which is located about 8.115 mm above the third location 44 where an extension of the internal surface 40 intersects the axis of revolution 12.

The system of lenses includes a first, upper lens 50 located within a lower portion of the hole 28, a second, intermediate lens 52 located below the upper lens 50, and a third, lower lens 54 located below the intermediate lens 52. The upper lens 50 has a convex upper surface 56 with a radius of about 18.000 mm and a lower surface with a radius of about 20.475 mm. The intermediate lens 52 has an upper, convex surface 60 with a radius of about 6.060 mm and a lower, concave surface 62 with a radius of about 4.700 mm. The lower lens 54 has an upper, concave surface 64 with a radius of about 10.550 mm and a lower, convex surface 66 with a radius of about 5.325 mm. Other features of the upper, intermediate and lower lenses 50, 52 and 54 are not discussed further in detail herein as these features would be evident to one of ordinary skill in the art.

In use, the light from a 360° surrounding panoramic scene enters the transparent component 20 through the upper, convex surface 22. Light is received from the surrounding panoramic scene for an unbroken included angle 72, in a vertical plane of the axis of revolution 12, extending from an angle 74 which is located about 30° below the horizon to an angle 76 which is located about 30° above the horizon. By extending the upper, convex lens 22 or altering its shape, the angle 76 below the horizon may be increased. When the light enters the transparent component 20, the light is refracted slightly downwardly by the upper, convex surface 22, thus reducing the angle of the light with respect to vertical. The light then passes through the transparent component 20 and is then reflected upwardly by the reflective surface 38. Due to be convex shape of the reflective surface 38, the angle of the light with respect to vertical is further reduced after reflection from the reflective surface 38. The light then passes through the transparent component 20 and exits the transparent component through the internal surface 40. Due to the concave shape of the internal surface 40, the light is refracted slightly upwardly when exiting the transparent component 20 through the internal surface 40, thus further reducing the angle of the light with respect to vertical.

After leaving the transparent component, the light passes upwardly through the hole 28 and is reflected downwardly by the reflective area 46 of the mirror 16. The light then passes downwardly through the hole 28 and whereafter it is refracted respectively by the upper lens 50, the intermediate lens 52, and the lower lens 54. The light, after leaving the lower lens 54, is focused by creating a flat image on a flat focal plane 78.

It can be seen from the aforegoing description that a simple, compact arrangement is provided which is capable of capturing a view of a 360° surrounding panoramic scene. In particular, the panoramic imaging arrangement 10 includes only five components namely the lens block 14, the mirror 16 and the upper, intermediate and lower lenses 50, 52 and 54. Moreover, all the surfaces of the panoramic imaging arrangement 10 which manipulate light are spherical or substantially spherical so as to be easily manufacturable.

A final image is created which is corrected for image flatness and astigmatism. It could be noted that no particular surface or surfaces correct for image flatness and astigmatism, but rather that the sizes, positioning and orientations of all the surfaces cooperate to produce a final image which is corrected for image flatness and astigmatism. It has been found that the panoramic imaging arrangement 10 is particularly suitable for creating a monochromatic image of the surrounding panoramic scene. One of ordinary skill in the art would appreciate that the panoramic imaging arrangement 10 may be modified or may be complemented by additional lenses which would make it more suitable for capturing color images of a surrounding panoramic scene.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. A panoramic imaging arrangement comprising:
   a transparent component having:
   a first surface, about an axis of revolution, having a convex profile with a first curvature in a plane of the axis of revolution;
   a second, substantially spherical surface, about the axis of revolution, having a concave profile with a second curvature in a plane of the axis of revolution; and
   an opening formed therein to define a third internal surface, about the axis of revolution, having a concave profile with a third curvature in a plane of the axis of revolution the first curvature being larger than the third curvature; and a reflective material on the second surface to provide a convex reflective surface against the second surface, wherein the first surface and the reflective surface are positioned relative to one another so that light from a 360° surrounding panoramic scene enters the transparent component through the first surface, whereafter the light is reflected from the reflective surface, whereafter the light leaves the transparent component through the third surface.

2. A panoramic imaging arrangement according to claim 1 wherein the first surface is substantially spherical.

3. A panoramic imaging arrangement according to claim 2 wherein the first surface and the reflective surface are located on opposing sides of the transparent component and the reflective surface has a convex profile in a plane of the axis of revolution.

4. A panoramic imaging arrangement according to claim 3 wherein at least extensions of the first surface and the reflective surface intersect one another.

5. A panoramic imaging arrangement according to claim 1 wherein the third surface is substantially spherical.

6. A panoramic imaging arrangement of claim 1 wherein the first surface, the reflective surface and the third surface are all substantially spherical and have radiuses which are in the relationship of about 21 units for the first surface, about 40 units for the reflective surface, and about 7 units for the third surface.

7. A panoramic imaging arrangement according to claim 6 wherein at least extensions of the first surface and the reflective surface intersect the axis of revolution at respectively first and second locations which are about 9 units displaced from one another.

8. A panoramic imaging arrangement according to claim 7 wherein at least an extension of the third surface intersects the axis of revolution at a third location which is about 0.5 units displaced from the second location.

9. A panoramic imaging arrangement according to claim 1 wherein the light passes through a total of less than five lenses from exiting the transparent component until being focused.

10. A panoramic imaging arrangement according to claim 9 wherein the light passes through a total of three lenses from exiting the transparent component until being focused.

11. A panoramic imaging arrangement according to claim 1, further comprising a system of lenses positioned to receive light after exiting the transparent component, the system of lenses at least focusing the light, the light being focused in a plane which is substantially flat.

12. A panoramic imaging arrangement according to claim 11 further comprising a mirror which reflects the light after exiting the transparent component, wherein a hole is formed through the transparent component, the opening forming at least part of the hole, through which the light at least partially passes after being reflected by the mirror and before passing through the system of lenses.

13. A panoramic imaging arrangement according to claim 12 wherein the mirror is curved.

14. A panoramic imaging arrangement according to claim 13 wherein the mirror has a concave reflective area.

* * * * *